(12) United States Patent
Campbell et al.

(10) Patent No.: US 8,401,055 B1
(45) Date of Patent: Mar. 19, 2013

(54) COMMUNICATIONS METHODS AND APPARATUS

(75) Inventors: Colin Campbell, Cambridge (GB); Oliver Charlesworth, Cambridge (GB); Peter Worters, Menlo Park, CA (US)

(73) Assignee: Spidercloud Wireless Inc., Santa Clara, CA (US)

( * ) Notice: Subject to any disclaimer, the term of this patent is extended or adjusted under 35 U.S.C. 154(b) by 517 days.

(21) Appl. No.: 12/608,400

(22) Filed: Oct. 29, 2009

Related U.S. Application Data

(60) Provisional application No. 61/110,533, filed on Oct. 31, 2008.

(51) Int. Cl.
*H04B 1/00* (2006.01)

(52) U.S. Cl. ........ 375/147; 375/142; 375/143; 375/144; 375/145; 375/149; 375/150; 375/152; 375/130; 375/316

(58) Field of Classification Search .................. 375/147, 375/142, 143, 144, 145, 149, 150, 152, 130, 375/316
See application file for complete search history.

(56) References Cited

U.S. PATENT DOCUMENTS

| | | | | |
|---|---|---|---|---|
| 7,822,107 B2 * | 10/2010 | Hsieh | ............................ | 375/148 |
| 2007/0064775 A1 * | 3/2007 | Petre et al. | .................... | 375/147 |
| 2008/0125134 A1 * | 5/2008 | Usuda et al. | ............... | 455/452.1 |

* cited by examiner

*Primary Examiner* — Siu Lee

(57) ABSTRACT

Apparatus for recovering symbols from control and data channels corresponding to a plurality of users is described. Samples corresponding to control channel signals from multiple users are processed on a time shared basis with various control channel processing elements being reused multiple times to processes the samples and recover signals, e.g., symbols, corresponding to the plurality of users. While the control channel processing elements are used on a time shared basis, a separate data channel processing chain or module maybe provided for each of the plurality of users. In some embodiments the order of despreading and filtering is reversed for the control and data channel signal processing.

14 Claims, 3 Drawing Sheets

COMMUNICATIONS METHODS AND APPARATUS

RELATED APPLICATION

This application claims the benefit of the filing date of U.S. Provisional Application No. 61/110,533 filed on Oct. 31, 2008, and entitled "COMMUNICATIONS METHODS AND APPARATUS" and which is hereby expressly incorporated by reference in its entirety.

FIELD

The present application is directed to communications methods and apparatus, and more particularly, to methods and apparatus which can be used to process uplink signals.

BACKGROUND

There is a growing interest in the use of small base stations, e.g., femtocells. As the size and number of users supported by a base station diminishes, the cost of the base station can be spread over fewer users. Accordingly, with regard to relatively small base stations, e.g., femtocells, from a commercial implementation perspective keeping hardware costs down becomes important. While keeping hardware costs down is important to commercial success being able to support multiple users at the same time can also be important.

In view of the above, it should be appreciated that there is a need for efficiently performing uplink processing, from a hardware prospective, while supporting multiple users.

SUMMARY

Samples corresponding to control channel signals from multiple users are processed on a time shared basis with various control channel processing elements being reused multiple times to processes the samples and recover signals, e.g., symbols, corresponding to the plurality of users. In some implementations, a control channel despreading module and/or a control channel rake filter module are used on a time shared basis to process a stored set of received samples and recover therefrom control channel input corresponding to different users over time. While the control channel processing elements are used on a time shared basis, a separate data channel processing chain or module 312, 322 may, and in some embodiments is provided for each of the plurality of users.

The time shared approach to the processing of control channels corresponding to different users while the data channels are processed for the different users individually takes advantage of the relatively low rate of the control channel signalling as compared to the potentially much higher rate of the user data channels.

While not required or used in all embodiments, in some embodiments, the order of despreading and filtering is reversed for the control and data channel signal processing. In some, but not necessarily all embodiments, control channel despreading is performed, e.g., by a module 306, prior to filtering by a filtering module 308. However, in at least one such embodiment in the case of user data channels filtering is performed by a module, e.g., module 316, prior to despreading by, e.g., a despreading module 320.

Given that the despreading is the same for different users with regard to the control channel and that despreading reduces the data rate considerably, by placing the filter module 308 after the despreading module 306, it is possible to operate the filter module at a lower rate than would be required if placed prior to despreading allowing for a lower cost implementation than would be possible if the filtering were performed at the higher data rate prior to despreading. In the case of user data channels however, different despreading may be required for different ones of a user's multiple data channels. Thus, in the case of user data channel signal processing, in some embodiments it is preferable to perform filtering prior to despreading as shown in the FIG. 3 embodiment while in the case of the control signals it is easier to implement filtering after the despreading.

While the present invention is directed to apparatus such as the one shown in FIG. 3, the invention is also directed to methods of signal processing. In various embodiments, the apparatus shown in FIG. 3 may be used to implement the exemplary methods.

DETAILED DESCRIPTION

Figure 1:
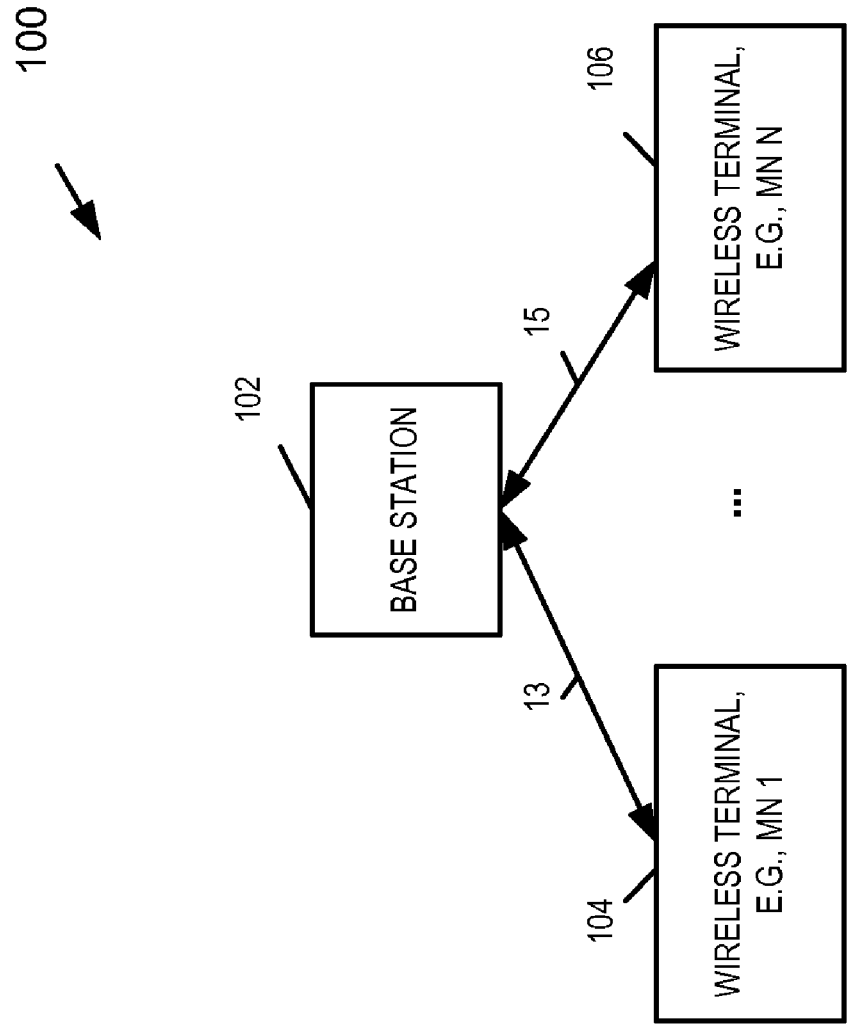
FIG. 1 illustrates an exemplary communication system implemented in accordance with one embodiment of the invention.

FIG. 1 illustrates a communications system 100 implemented in accordance with one exemplary embodiment of the invention. In the system 100, multiple wireless terminals, e.g., mobile nodes MN 1 (104) through MN N (106) communicate with a base station 102, e.g., a femtocell, through the use of communication signals 13, 15. While shown as exemplary mobile nodes, the wireless terminal may also include stationary devices. Each mobile terminal may correspond to a different mobile user and are therefore sometimes referred to as user terminals. The signals 13, 15 may be, e.g., CDMA or OFDM signals. The base station 102 performs uplink signal processing in accordance with the invention. Thus, signals 13, 15 include uplink signals.

Figure 2:
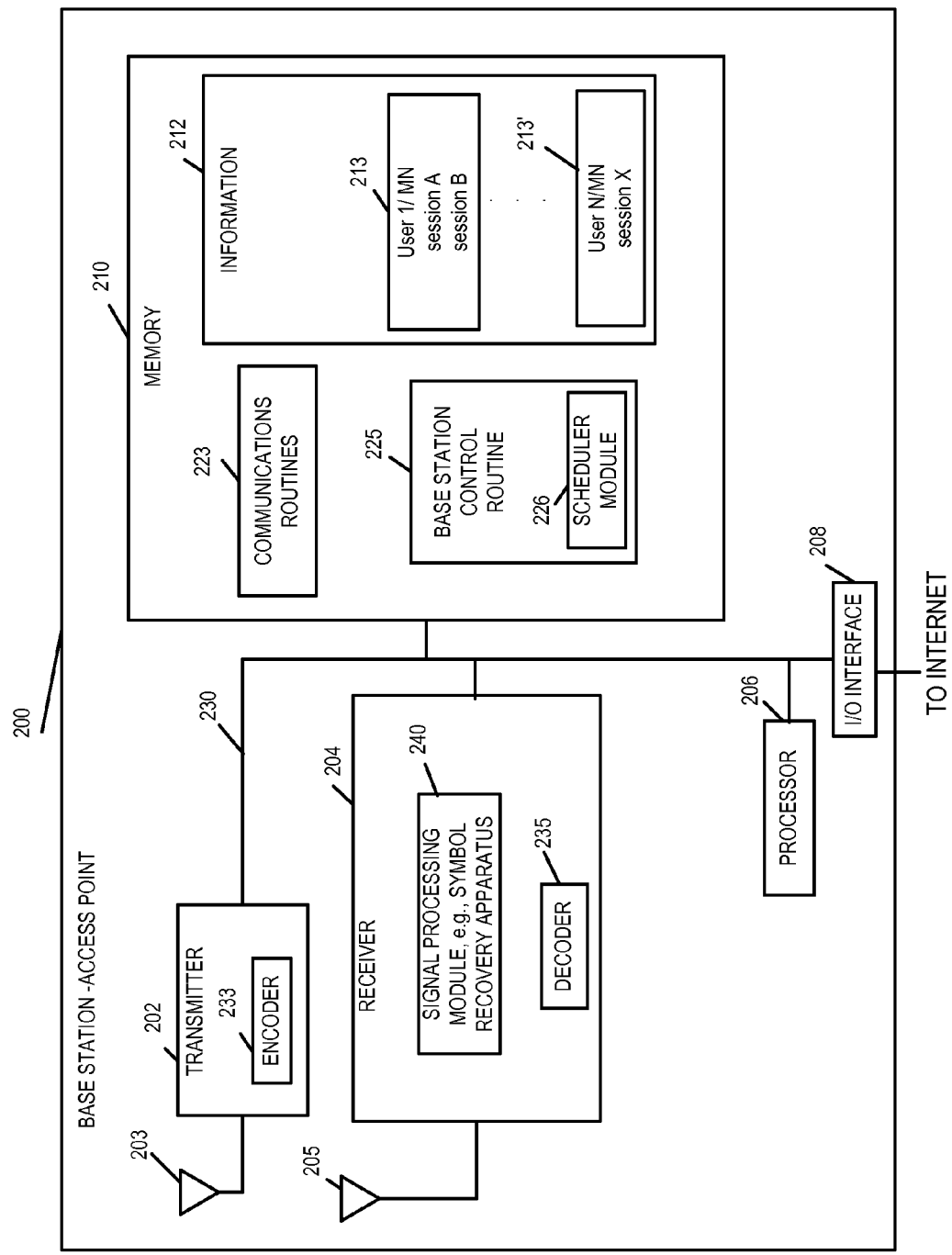
FIG. 2 illustrates an exemplary base station, e.g., access point, implemented in accordance with the invention.
Figure 3:
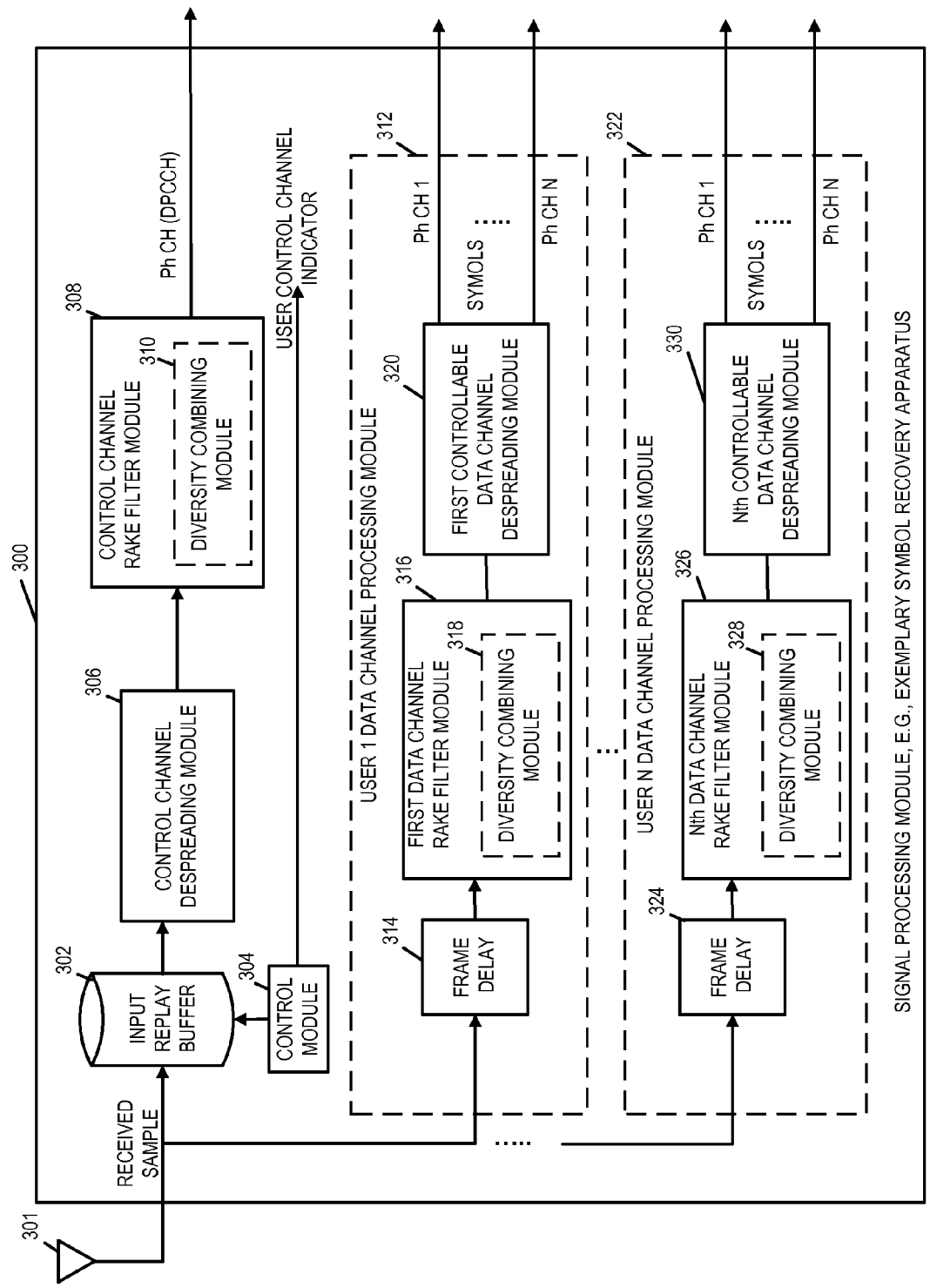
FIG. 3 illustrates an exemplary symbol recovery apparatus which can be used in the exemplary base station shown in FIGS. 1 and 2, in accordance with one aspect of the invention.

FIG. 2 illustrates an exemplary base station 200 which may be e.g., an access router, implemented in accordance with the invention. In some embodiments the base station 200 can be used as, e.g., femtocell 102 of system 100. The base station 200 includes antennas 203, 205 and transmitter receiver circuitry 202, 204. The transmitter circuitry 202 includes an encoder 233 while the receiver circuitry 204 includes a decoder 235. The receiver circuitry 204 further includes a processing module 240 which may be implemented in accordance with the invention, e.g., as shown in FIG. 3. The transmitter and receiver circuitry 202, 204 is coupled by a bus 230 to an I/O interface 208, processor (e.g., CPU) 206 and memory 210. The I/O interface 208 couples the base station 200 to the internet and/or an IP network. The memory 210 includes routines, which when executed by the processor 206, cause the base station 200 to operate in accordance with the invention. Memory includes communications routines 223 used for controlling the base station 200 to perform various communications operations and implement various communications protocols. The memory 210 also includes a base station/femtocell control routine 225 used to control the base station 200 to implement the steps of the method of the present invention described above. The base station control routine 225 includes a scheduler module 226 used to control transmission scheduling and/or communication resource allocation. Thus, module 226 may serve as a scheduler. Memory 210 also includes information used by communications routines 223, and control routine 225. The information 212 includes an entry for each active mobile station user 213, 213' which lists the active sessions being conducted by the user and includes information identifying the mobile station (MN) being used by a user to conduct the sessions.

FIG. 3 illustrates an exemplary uplink signal processing apparatus 300 which may be used in the receiver of the base station shown in FIG. 2. Signals received by antenna 301 are sampled and stored in input replay buffer 302 and also supplied to the input of each of the user data channel processing modules 312, 322. Control channel processing is performed for each N supported users on a time shared basis using control channel despreading module 306 and control channel rake filter module 308, where N is an integer greater than or equal to 1. In some embodiments N is, e.g., 2, 5, 20 or more. The module 308 optionally includes a diversity combining module 310. The control module 304 causes the input replay buffer 302 to output a stored set of samples once for each of the N users with the user control channel indicator indicating which of the N users the output of the filter module 308 corresponds to at any given point in time. Note that control channel despreading module 306 precedes the filter module 308 in the FIG. 3 embodiment. While this is not mandatory, in the illustrated embodiment it allows the filter module 308 to operate at a lower clock rate than the despreading module 306 since the despreading module 306 reduces the sample rate from that output by the input replay buffer 302.

While control channel processing is performed on a time shared basis, user data channel signal processing is performed on a per user basis with a separate data channel processing module, e.g., such as modules 312, 322, being provided for each of the N users. Each data channel processing module 312, 322 includes a frame delay unit 314, 324, a data channel filter module 316, 326 and a data channel despreading module 320, 330. Note that in at least some embodiments, such as the one shown in FIG. 3, the filter module 316, 326 precedes the despreading module 320, 330.

The filter modules may be optionally implemented as rake filter modules and, depending on the embodiment, may include an optional diversity combining module 318.

The techniques of various embodiments may be implemented using software, hardware and/or a combination of software and hardware. Various embodiments are directed to apparatus, e.g., base stations including one or more attachment points, mobile nodes such as mobile access terminals, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In some embodiments various features are implemented using modules. Such modules may be implemented using software, hardware or a combination of software and hardware. Many of the above described methods or method steps can be implemented using machine executable instructions, such as software, included in a computer readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a computer readable medium including computer executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as base stations are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many OFDM as well as non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. An apparatus for recovering symbols from control and data channels, comprising:
  a control channel despreading module coupled to an input replay buffer configured to receive a set of input samples from the input replay buffer and to despread the input samples at a fixed rate to produce despread symbols;
  a control channel rake filter module configured to receive the despread symbols from the control channel despreading module and to produce control channel symbols therefrom;
  a first data channel rake filter configured to process said set of input samples to produce a first set of rake filtered samples; and
  a first controllable data channel despreading module that supports a plurality of data channel despreading rates, said first controllable data channel despreading module being coupled to the first data channel rake filter and being configured to produce a first set of data symbols from said first set of rake filtered samples.

2. The apparatus of claim 1, further comprising:
said input replay buffer, said input replay buffer being configured to supply said set of input samples multiple times to said control channel despreading module; and
a control module coupled to said input replay buffer and being configured to control said input replay buffer to output said set of input samples once per user being supported during a time period corresponding to said set of input samples and to control the configuration of the control channel rake filter module and the control channel despreading module, said control channel rake filter module and control channel despreading module being configured to correspond to a different one of said users being supported each time said set of input samples is processed.

3. The apparatus of claim 2, further comprising:
a second data channel rake filter module configured to process said set of input samples to produce a second set of rake filtered samples; and
a second controllable data channel despreading module that supports the plurality of data channel despreading rates, said controllable data channel despreading module being configured to receive said second set of rake filtered samples from the second data channel rake filter and to produce a second set of data symbols.

4. The apparatus of claim 2, further comprising:
a third data channel rake filter module configured to process said set of input samples to produce a third set of rake filtered samples, said third set of rake filtered samples corresponding to a different user, said different user being a user other than a user of said first set of rake filtered samples; and
a third controllable data channel despreading module that supports the plurality of data channel despreading rates configured to receive said third set of rake filtered samples from the third data channel rake filter and to produce a third set of data symbols corresponding to said different user.

5. The apparatus of claim 2, wherein said apparatus includes at least as many data channel rake filter modules as users supported during said time period to which said set of input samples corresponds.

6. The apparatus of claim 5, wherein said control channel rake filter module is also configured to perform a diversity combining.

7. The apparatus of claim 6, wherein said first data channel rake filter module is also configured to perform diversity combining.

8. A method of recovering symbols from control and data channels, comprising:
operating a control channel despreading module to perform a despreading operation at a fixed rate on a set of input samples to produce despread symbols;
operating a control channel rake filter to receive the despread symbols from the control channel despreading module and to produce control channel symbols therefrom;
operating a first data channel rake filter to process said set of input samples and to produce a first set of rake filtered samples therefrom; and
operating a first controllable data channel despreading module to produce a first set of data symbols from said first set of rake filtered samples, said first controllable data channel despreading module supporting a plurality of data channel despreading rates.

9. The method of claim 8, further comprising:
operating a buffer to supply said set of input samples multiple times to said control channel despreading module; and
controlling said buffer to output said set of input samples once per user being supported during a time period corresponding to said set of input samples and controlling the configurations of the control channel rake filter and control channel despreading module to correspond to a different one of said users being supported each time said set of input samples are processed.

10. The method of claim 9, further comprising:
operating a second data channel rake filter to process said set of input samples to produce a second set of rake filtered samples; and
operating a second controllable data channel despreading module to produce a second set of data symbols, said second controllable data channel despreading module supporting the plurality of data channel despreading rates.

11. The method of claim 9, further comprising:
operating a third data channel rake filter to process said set of input samples to produce a third set of rake filtered samples, said third set of rake filtered samples corresponding to a different user, said different user being a user other than a user of said first set of rake filtered samples; and
operating a third controllable data channel despreading module to produce a third set of data symbols corresponding to said different user, said third controllable data channel despreading module supporting the plurality of data channel despreading rates.

12. The method of claim 9, wherein said method includes using at least as many data channel rake filters as users supported during said time period to which said set of samples corresponds.

13. The method of claim 12, further comprising:
operating said control channel rake filter to perform a diversity combining operation.

14. The method of claim 13, further comprising:
operating said first data channel rake filter to perform a diversity combining operation.

* * * * *